Oct. 10, 1933.                F. A. CANON                1,929,624
                            CHEMICAL APPARATUS
                            Filed July 22, 1930
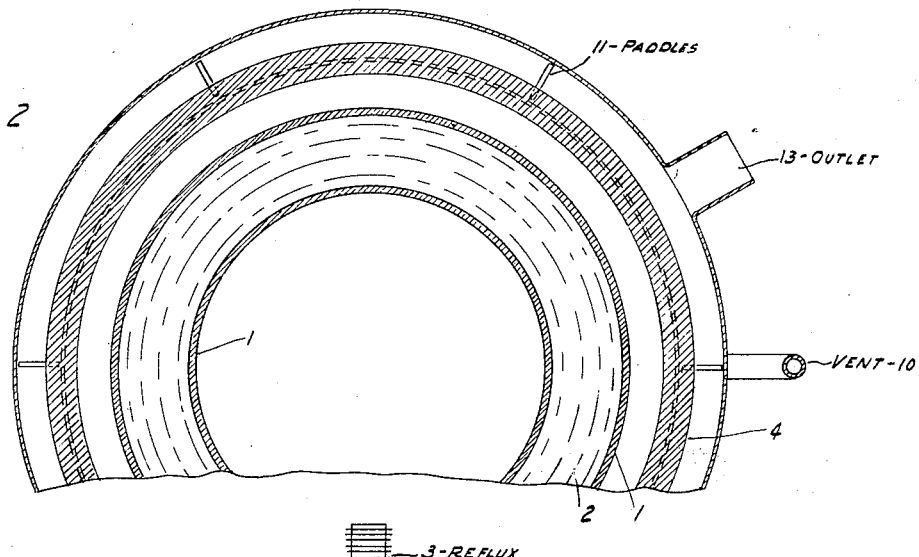
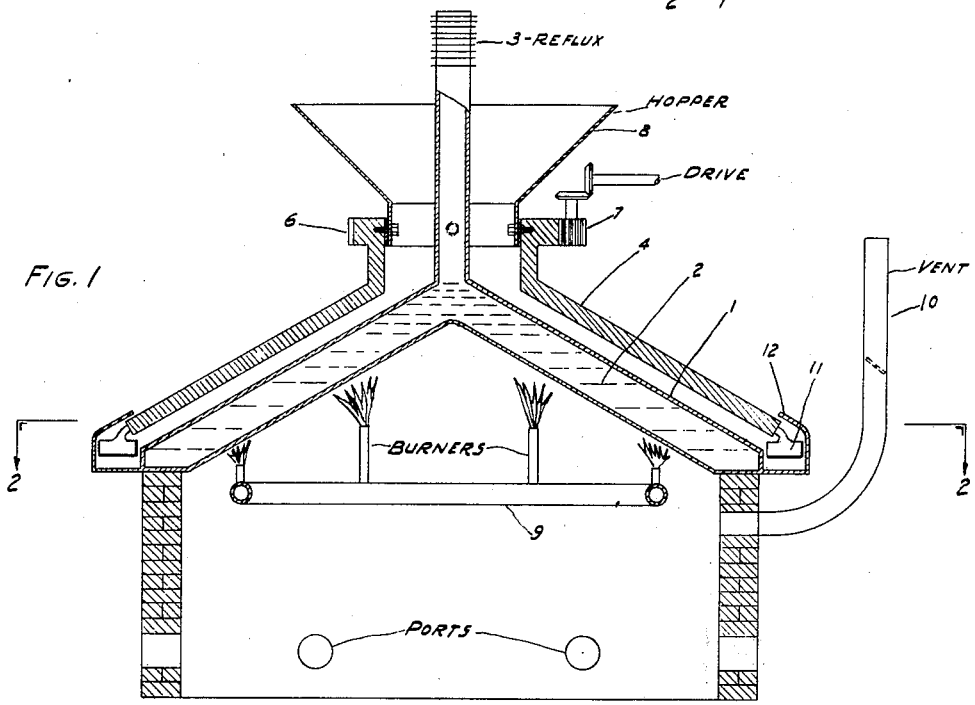
INVENTOR
FRANK A. CANON
ATTORNEY Patented Oct. 10, 1933

1,929,624

UNITED STATES PATENT OFFICE 1,929,624

CHEMICAL APPARATUS

Frank A. Canon, Crafton, Pa., assignor to The Selden Company, Pittsburgh, Pa., a corporation of Delaware Application July 22, 1930. Serial No. 469,670

3 Claims. (Cl. 23—285)

This invention relates to a method and apparatus for producing monocarboxylic acids and their derivatives from polycarboxylic acids, and more specifically to the production of benzoic acid from phthalic acid.

In the past benzoic acid has been prepared from phthalic acid by passing a mixture of calcium phthalate and calcium hydroxide with a diluent such as calcium carbonate through narrow heated tubes. This procedure is described in the patent to Fairweather, Beckett and Thomas No. 1,727,102 dated September 3, 1929. This process has proved to be of little value practically since the difficulties of slowly conveying the material through narrow heated tubes are practically insuperable. At the high temperature at which the reaction takes place there is a serious tendency for the material to agglomerate and form a thin coating on the inside of the tube, resulting in much spoiled material and so decreasing the heat conduction as to make the process practically worthless.

According to the present invention the reaction components are caused to pass slowly over a heated conical surface, being constantly agitated by a second cone rotating over the first cone and spaced a short distance therefrom. The constant agitation and grinding effect completely prevents caking which is so serious a problem in the prior art processes and obviates the necessity for the close tolerances necessary in the narrow tubes described in the prior art.

The invention is not only applicable to the production of benzoic acid or, rather, benzoates from phthalic acid, but is generally applicable to the production of other monocarboxylic acid compounds from polycarboxylic acid compounds, for example, the production of naphthoic acid from naphthalic acid, propionic acid from succinic acid, etc.

If desired a protecting atmosphere may be provided during reaction. Any suitable protecting atmosphere may be used such as an inert gas, for example nitrogen, or, if desired, a reducing atmosphere may be used such as hydrogen, hydrocarbon vapors, and the like; steam may also be used. When hydrogen is used, particularly with salts of the polycarboxylic acid and reducing metals such as copper, nickel, zinc and the like, aldehydes may be obtained. The production of aldehydes or acids by carrying out the process in a reducing atmosphere is not claimed per se in the present application, this being the subject-matter of the co-pending application of A. O. Jaeger, Serial No. 359,722 filed May 1, 1929.

The invention will be described in greater detail in connection with the drawing in which Fig. 1 is a vertical section through an apparatus for carrying out the present invention; and Fig. 2 is a horizontal section through Fig. 1 along the line 2—2.

The apparatus consists of a hollow casting 1, filled with a bath 2 and provided with a reflux 3, the casting being mounted in a suitable brick furnace provided with burners 9 and a vent 10. A conical member 4 rotates just above the surface of the casting 1, being spaced therefrom by the material passing through. This member is provided with a gear 6, meshing with the pinion 7, driven by any suitable means, and at its periphery is provided with six paddles 11 moving through a circular trough 12 which forms a continuation of the casting 1. A hopper 8 extends into a central well in the gear 6 to which it is bolted and serves for the introduction of reaction mixture and an outlet 13 (Fig. 2) is provided in the trough 12 through which reacted material is discharged by the paddles 11.

The bath may be of any suitable type, for example a non-boiling bath, as lead, a eutectic mixture of sodium nitrate and nitrite, etc., or a bath may be used which boils at the temperature at which it is desired to maintain the upper surface of the cone 1. Such a bath may contain mercury if pressure is provided on the reflux 3, but preferably an alloy of mercury, such as a lead-mercury alloy, should be used as such alloys can be readily prepared having boiling points at atmospheric pressure at the range desired for the reaction, namely about 400-450° C. and as they contain relatively large amounts of lead the cost is much lower than when mercury is used alone. Of course, if desired the cone 1 may be made of solid metal and heated without the intervention of a bath but this causes a much less accurate control and increases the supervision necessary to maintain reaction temperatures at the desired point. For this reason a boiling or non-boiling bath is preferred, although the invention is in no sense limited thereto.

The boiling bath has the further advantage that the reflux is located in the apex of the cone and passes through the feed hopper for reacting material. The reacting material, therefore, contacts with the reflux and is preheated, absorbing heat from the vapors by condensation. This preheating greatly lessens the time during which the material must remain between the cone surfaces as it is already nearly at reaction temperature on entering. At the same time the residual moisture is driven out which removes any occluded air. When a mercury alloy is used, as in the preferred modifications of the invention, the vapors are relatively rich in mercury and consequently condense at a temperature close to the boiling point of mercury, i. e. 357° C., although the temperature of the boiling bath itself is from 400 to 450° C., the boiling point of the alloy. Accordingly, in condensing, the rich mercury vapors in the reflux preheat the incoming material in the feed hopper only to a temperature of below 357° C. which is not high enough to cause the reaction to start before the material passes between the rotating cones.

The operation will be described in connection with the production of calcium benzoate and calcium phthalate. A mercury-lead alloy having a boiling point of 437° C. is filled into the casting 1 and is heated by the burners 9 until it begins to boil, the vapors being condensed in the reflux 3 and returned. A mixture containing calcium phthalate, calcium hydroxide and calcium carbonate in the proportion of 2 mols calcium phthalate, 1.2 mols calcium hydroxide and a weight of calcium carbonate equal to two-thirds the combined weight of the calcium phthalate and calcium hydroxide is filled into the hopper 8 and discharges upon the heated surfaces of the cone 1. The rotation of the conical member 4, which may be provided with suitable grooves if desired, gradually causes the reaction mixture to pass in a thin layer spirally down the surface of the heated cone and finally out into the trough 12, thence continuously discharging through the outlet 13 (Fig. 2). The thickness of the layer of reacting material is determined by the weight of the member 4 which is permitted to rest on it by gravity although, if desired, this member may be provided with a more positive means for adjusting its pressure on the material. The rotation is so timed as to give a period of heating from about 10 to 60 minutes. If desired an inert atmosphere may be maintained in the trough 12 although this is not usually necessary as the reaction mixture when actually passing over the heated surfaces is not open to the atmosphere. It is normally not necessary to provide for an inert atmosphere in the feed hopper 8, since the steam evolved by contact of the material with the reflux will give sufficient protection for, of course, there is always some residual moisture as the powder is not usually obtained in a completely dry form.

With a 15 minute heating the yields of calcium benzoate are from 85 to 92%, the remainder consisting of about equal parts of unreacted calcium phthalate and waste material such as benzol, charred material, and the like. The waste material makes it desirable to use an excess of calcium hydroxide over that theoretically required and the actual temperature control of the heated conical casting permits using less diluent than is desired in the prior art. It should be understood, however, that the use of an excess of lime is not claimed per se in the present invention except in connection with the particular apparatus and method of reaction which forms the basis of the present invention. The use of excess lime generally forms the basis of the co-pending application of A. O. Jaeger, Serial No. 471,594 filed July 29, 1930. I likewise do not claim per se the use of an amount of diluent less than the combined weight of polycarboxylic acid salt and alkaline earth metal hydroxide, this forming the subject matter of the co-pending application of L. C. Daniels, Serial No. 474,877 filed August 12, 1930.

It will be seen that the present invention constitutes a simple, easily constructed apparatus and can be continuously operated with a minimum of trouble, completely eliminating the difficulties due to caking and sticking which were so serious in the narrow heated chambers of the prior art. In the preferred embodiment, the temperature control is extremely accurate and may be automatic where a boiling bath is used and it is a great advantage of the present invention that the rotating member 4 is carried on the material itself, making it unnecessary to provide for weight carrying bearings subject to the temperature of the reaction. A very simple and reliable construction is thereby obtained since bearings are difficult to protect at high temperatures unless complicated structures such as, for example, water cooled bearings are provided.

In the drawing, which is in part diagrammatical, the rotating member 4 has been shown as spaced from the casting 1, in order to show more clearly the space through which the reacting mass is passed. In actual practice, it is of course understood that the rotating member 4 sits closely above the surface of the conical casting 1 in order to exert the desired friction and pressure upon the reacting material.

What is claimed as new is:

1. An apparatus for carrying out the transformation of salts of polycarboxylic acids to salts of monocarboxylic acids, which comprises in combination a stationary, horizontal cone member having its apex pointing up and containing a bath boiling at the temperature of the reaction, the cone being provided with a reflux condenser to condense and return vapors of said bath, a rotatable member fitting loosely over said horizontal cone member and means for introducing pulverulent material between said members.

2. An apparatus for carrying out the transformation of salts of polycarboxylic acids to salts of monocarboxylic acids, which comprises in combination a stationary, horizontal cone member having its apex pointing up and containing a bath boiling at the temperature of the reaction, the cone being provided with a reflux condenser to condense and return vapors of said bath, a rotatable member fitting loosely over said cone member, means for introducing pulverulent material between the said members, and means for continuously discharging the pulverulent material emerging from the periphery of the cones.

3. An apparatus for carrying out the transformation of salts of polycarboxylic acids to salts of monocarboxylic acids, which comprises in combination a stationary, horizontal cone member having its apex pointing up and containing a bath boiling at the temperature of the reaction, a reflux condenser situated at the apex of the cone, a rotatable cone member fitted loosely over said stationary cone member and containing a cylindrical central well surrounding said reflux and forming therewith an inlet chamber for preheating the incoming polycarboxylic acid salts, and drive means engaging the outer edge of said central well.

FRANK A. CANON.